(12) United States Patent
Lawrence et al.

(10) Patent No.: US 12,130,913 B2
(45) Date of Patent: *Oct. 29, 2024

(54) SELF-DEFENDING MOBILE DEVICE

(71) Applicant: Bank of America Corporation, Charlotte, NC (US)

(72) Inventors: Myles Lawrence, Charlotte, NC (US); Amanda Jane Adams, Flint (GB)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/224,036

(22) Filed: Jul. 19, 2023

(65) Prior Publication Data

US 2023/0359733 A1 Nov. 9, 2023

Related U.S. Application Data

(63) Continuation of application No. 17/112,303, filed on Dec. 4, 2020, now Pat. No. 11,755,727.

(51) Int. Cl.
*G06F 21/55* (2013.01)
*G06F 21/52* (2013.01)
(Continued)

(52) U.S. Cl.
CPC ............ *G06F 21/554* (2013.01); *G06F 21/52* (2013.01); *G06F 21/56* (2013.01); *H04L 9/3236* (2013.01);
(Continued)

(58) Field of Classification Search
CPC ........ G06F 21/554; G06F 21/52; G06F 21/56; G06F 2221/034; G06F 2221/2111;
(Continued)

(56) References Cited

U.S. PATENT DOCUMENTS 9,230,106 B2 1/2016 Eliseev et al.
9,967,278 B2 5/2018 Jevans et al.
(Continued)

FOREIGN PATENT DOCUMENTS

CN 105095742 A 11/2015
EP 3367278 A1 * 8/2018 ............. G06F 21/31
(Continued)

*Primary Examiner* — Christopher A Revak
(74) *Attorney, Agent, or Firm* — Banner & Witcoff, Ltd.

(57) ABSTRACT

A computing device monitors for an event trigger by a secure computing module. Based on identifying an event trigger at the computing device, the secure computing module executes a health check according to a configuration identifying operating anomalies that are indicative of malicious activity at the computing device. The health check includes scanning a filesystem and communications module operation and configuration of the computing device for indications of malicious activity. Based on identified operating anomalies at the computing device, the secure computing module determines response measures to secure the computing device. The secure computing module executes the response measures individually or in combination at the computing device based on a response configuration.

20 Claims, 5 Drawing Sheets

(51) Int. Cl.
*G06F 21/56* (2013.01)
*H04L 9/32* (2006.01)

(52) U.S. Cl.
CPC  *G06F 2221/034* (2013.01); *G06F 2221/2111* (2013.01)

(58) Field of Classification Search
CPC . G06F 21/566; G06F 21/6245; H04L 9/3236; H04L 9/3247; H04L 9/3226
See application file for complete search history.

(56) References Cited

U.S. PATENT DOCUMENTS

| | | | |
|---|---|---|---|
| 10,097,576 | B2 | 10/2018 | Jevans et al. |
| 10,182,062 | B2 | 1/2019 | Aabye et al. |
| 10,292,039 | B2 | 5/2019 | Fares |
| 10,404,735 | B2 | 9/2019 | Jain |
| 10,623,435 | B2 | 4/2020 | Jevans et al. |
| 10,860,405 | B1 | 12/2020 | Zonneveld et al. |
| 11,755,727 | B2 * | 9/2023 | Lawrence ............. H04L 9/3226 726/23 |
| 2014/0109176 | A1 | 4/2014 | Barton et al. |
| 2014/0150049 | A1 | 5/2014 | Kwon et al. |
| 2015/0006405 | A1 * | 1/2015 | Palmer ............... G06Q 20/3825 705/72 |
| 2015/0172920 | A1 | 6/2015 | Ben Ayed |
| 2017/0017842 | A1 | 1/2017 | Ma et al. |
| 2018/0034802 | A1 * | 2/2018 | Shelton .................. G06F 21/31 |
| 2018/0063181 | A1 | 3/2018 | Jones et al. |
| 2018/0189520 | A1 * | 7/2018 | Wang .................. G06F 21/6245 |
| 2018/0234256 | A1 * | 8/2018 | Bowen ................ H04L 63/0823 |
| 2020/0288305 | A1 | 9/2020 | Bok et al. |
| 2020/0356459 | A1 | 11/2020 | Harutyunyan et al. |
| 2020/0358683 | A1 | 11/2020 | Huang et al. |
| 2020/0382484 | A1 * | 12/2020 | Hawkins ............. H04L 9/0894 |
| 2022/0094705 | A1 | 3/2022 | Tineo |

FOREIGN PATENT DOCUMENTS

| | | | | |
|---|---|---|---|---|
| WO | WO-2018081414 | A1 * | 5/2018 | ............. G06F 21/31 |
| WO | WO-2020221844 | A1 * | 11/2020 | ........... G08B 25/008 |

* cited by examiner

SELF-DEFENDING MOBILE DEVICE

CROSS REFERENCE TO RELATED APPLICATION(S)

This application is a continuation of and claims priority to U.S. application Ser. No. 17/112,303 entitled "Self-Defending Computing Device" filed on Dec. 4, 2020, which is incorporated by reference in its entirety.

BACKGROUND

Aspects of the disclosure relate to managing compromised operating conditions at computing device. One or more aspects of the disclosure relate to a computing platform (e.g., a mobile computing platform) having multiple processors that are capable of identifying comprised operations at the computing platform and executing response measures to protect sensitive information accessible at the computing platform.

Today, a variety of computing devices (e.g., mobile devices, mobile phones, tablets, and the like) are vulnerable to malicious use. These computing devices may be compromised (e.g., jailbroken, rooted, and the like) by malicious use of security flaws in their associated operating systems and by hardware flaws. Existing security mechanisms on these devices may be ineffective for detecting and preventing malicious activities (e.g., application execution, sensitive data exposure) when compromised due to software and/or hardware limitations. As such, a compromised computing device may lead to exposure and loss of sensitive data and information, and/or execution of unauthorized actions on behalf of an unauthorized third-party.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting and securing a compromised computing device.

In some cases, a computing device (e.g., a mobile device) may include a secure module. The secure module may include one or more secure processors and protected (e.g., read-only, secure, and the like) memory. The secure module may include one or more computer readable instructions (e.g., stored in the protected memory) to monitor the computing system (e.g., operating system, application(s), communication system(s), and the like) of the computing device for malicious activity that is indicative of the computing device being compromised (e.g., jailbroken, rooted, and the like). The secure module may monitor the computing device for malicious activity based on an interval of time (e.g., periodically) and/or an event trigger (e.g., a request for sensitive information) at the computing device. Based on monitoring the computing device for malicious activity, the secure module may execute a health check of the computing device. During the health check, the secure module may identify one or more anomalies that are indicative of a security flaw at the computing device. For example, the secure module may identify a malicious application that monitors communications sent and/or received over a network interface by the computing device. Additionally, for example, the secure module may identify an unsigned application (e.g., from an unknown source) that reads sensitive information (e.g., text) displayed at a display device coupled to the computing device.

The secure module of the computing device may perform one or more response measures to secure the compromised computing device based on a response configuration. The secure module of the computing device may perform one or more response measures, for example, based on identifying one or more anomalies during the device health check. The one or more response measures may inhibit further use of the computing device, prevent execution of one or more compromised application, and/or secure data available at the computing device. For example, the secure module may overwrite the contents of the computing device (e.g., the file system, biometric data, sensitive information) based on identifying an anomaly at the computing system. Additionally, or alternatively, for example, the secure module may encrypt data of the computing device using a public key, where a private key that is unavailable at the computing device (e.g., available from an entity associated with the computing device) may decrypt the encrypted data. The secure module may perform the one or more response measures individually and/or in combination to prevent further operation of the compromised computing device and/or to protect data available at the compromised computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
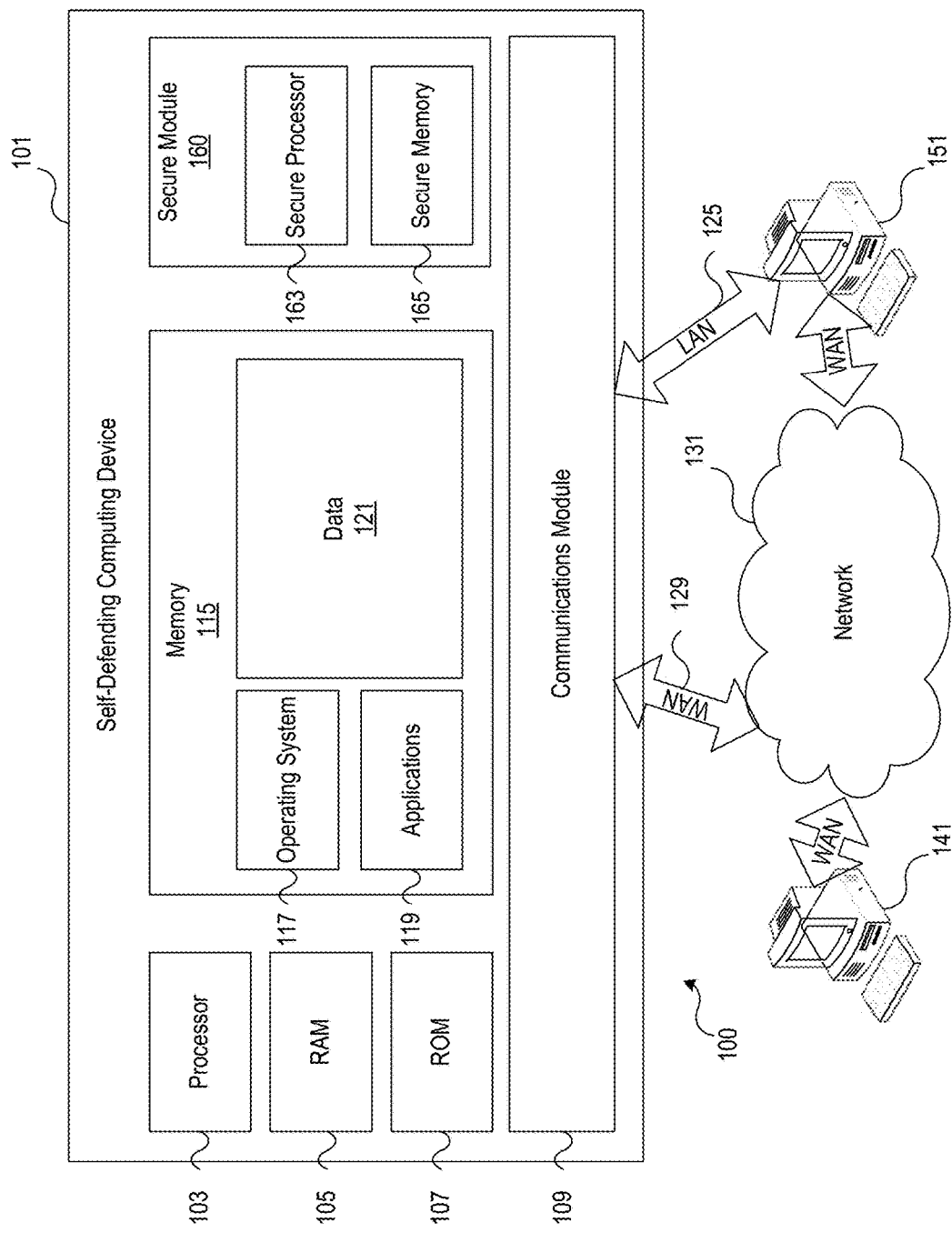
FIG. 1 shows an illustrative operating environment in which various aspects of the disclosure may be implemented in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

Today, computing systems operating on computing devices (e.g., mobile devices, mobile phones, tablets, and the like) may be vulnerable to malicious use through one or more security flaws. These security flaws may include flaws in the operating systems and in the hardware of computing devices, which, when leveraged, may allow computing devices to be compromised (e.g., jailbroken, rooted, and the like). A compromised computing device may be forced to execute unauthorized code, applications, and/or functions different from those authorized for use on a secured computing device (e.g., a computing device with normal operating conditions). For example, a compromised computing device may run unauthorized applications that bypass the security features of an operating system. While some users may prefer to use a compromised computing device (e.g., to provide extended functionality), in some cases, these compromised computing devices may expose their user data and/or execute malicious applications without user consent or knowledge. Most users may require secured computing devices that keep private or secure data protected from the malicious applications, functions, and features. However, existing security mechanisms lack efficacy for a compromised computing device. For example, malicious applications (and other unauthorized functions) may avoid detection, disable security mechanisms, and/or execute features beyond the secure operating boundaries of the computing device. As such, a need has been identified for an improved computing device with a self-defending system that is based on a trusted execution environment to detect and mitigate the malicious and/or unauthorized activities associated with compromised computing devices.

In some cases, a computing device, such as a mobile computing device, may include a secure processing module that operates in conjunction with the computing device's primary processor. The secure module may include one or more secure processors. While existing mobile computing devices may include a secure processor in some cases, the secure processor is often limited to performing cryptographic and/or algorithmic operations (e.g., hash generation/storage, biometric data generation/storage, password generation/storage, and the like) for the mobile computing device. In some cases, a self-defending computing device may include one or more secure processors in the secure module that may perform the cryptographic and/or algorithmic operations as described above and one or more self-defense operations as described herein. For example, a first secure processor may perform cryptographic/algorithmic operations and a second secure processor may perform the one or more self-defense operations as described herein. The secure module may perform the one or more self-defense operations to detect malicious and/or unauthorized activity at the computing device. The one or more self-defense operations (and other features of the secure module) may be stored as computer readable instructions on a protected (e.g., read-only) memory of the secure module. In some cases, the one or more self-defense operations may be stored as an application in the secure module.

The secure module of a self-defending computing device may monitor one or more elements of the self-defending computing device. The one or more elements may include a processor, memory (e.g., RAM, ROM, and the like), storage devices, communication systems (e.g., network interfaces), I/O devices (e.g., display devices, input devices), and/or any other hardware/software element associated with the computing device. The secure module may monitor for one or more anomalies (e.g., abnormal operating conditions) at the one or more elements of the self-defending computing device as described herein, where an anomaly may indicate that the computing device is compromised (e.g., by jailbreak, root, and the like). The secure module may perform monitoring of the elements of the computing device through a device health check, where the health check may occur periodically (e.g., every minute, every 30 minutes, every hour, and the like) and/or may occur based on an event trigger. The health check may include monitoring the file system of the computing device for unauthorized data stored in protected directories, identifying applications that are unsigned, self-signed, and/or use invalid signatures, and/or scanning network interfaces (e.g., communication ports) at a communication module of the computing device to identify non-standard use of network interfaces. The event trigger may be an event that involves an element (e.g., application, program, and the like) of the self-defending computing device accessing, requesting, and/or otherwise using information from the secure module. For example, by a primary processor of the self-defending computing device, an application may request the use of sensitive information (e.g., passwords, security keys, biometric information, and the like) from a secure memory that is protected in the secure module. The secure module may perform a device health check based on the query of information (e.g., sensitive information) from the secure module, where the secure module is unaffected in the event the computing device is compromised (e.g., due to the tamper-proof nature of the secure module).

The secure module may execute one or more response measures, for example, based on identifying one or more anomalies identified at the computing device in a health check. The one or more response measures may include an overwrite (e.g., a binary overwrite) of secure (e.g., sensitive) data and/or unsecure data stored at the computing device, encryption of secure data and/or unsecure data stored at the computing device, and/or replacing a security key of the computing device (e.g., a passcode to access the computing device) with a value that is not accessible via the input method(s) (e.g., a keyboard displayed at a touch sensitive display device) of the computing device. The one or more response measures may be used individually and/or in combination, for example, based on the severity and/or type of the one or more anomalies and based on a response configuration of the secure module.

FIG. 1 shows an illustrative operating environment in which various aspects of the present disclosure may be implemented in accordance with one or more example embodiments. Referring to FIG. 1, a computing system environment 100 may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The computing system environment 100 may include an illustrative self-defending computing device 101 having a processor 103 (e.g., a primary CPU) for controlling overall operation of the self-defending computing device 101 and its associated components, including a Random Access Memory (RAM) 105, a Read-Only Memory (ROM) 107, a communications module 109, and a memory 115 (e.g., primary memory). For example, the memory 115 may be a non-volatile memory source such as a non-volatile computer readable media device. The self-defending computing device 101 may include a secure module 160 that may include one or more secure processors (e.g., a secure processor 163) and/or one or more protected computer readable media (e.g., secure memory 165). For example, the secure memory 165 may be a non-volatile memory source such as a non-volatile computer readable media device. The self-defending computing device 101 may include a variety of computer readable media. The computer readable media may be any available media that may be accessed by the self-defending computing device 101, may be non-transitory, and may include volatile and nonvolatile, removable and non-removable media implemented in any method or technology for storage of information such as computer-readable instructions, object code, data structures, program modules, or other data. The computer readable media may include the RAM 105, the ROM 107, and/or the memory 115. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the self-defending computing device 101.

Although not required, various aspects described herein may be embodied as a method, a data transfer system, or as a computer-readable medium storing computer-executable instructions. For example, a computer-readable medium storing instructions to cause one or more processors (e.g., the processor 103, the secure processor 163) to perform steps of a method in accordance with aspects of the disclosed embodiments is contemplated. For example, aspects of method steps disclosed herein may be executed by the processor 103 and/or a secure processor (e.g., secure processor 163) to perform one or more self-defending operations at the self-defending computing device 101 for securing data. Such processors may execute computer-executable instructions stored on a computer-readable medium (e.g., memory 115, secure memory 165).

Software may be stored within the memory 115, secure memory 165, and/or other digital storage to provide instructions to the processor 103 and/or the one or more secure processors (e.g., secure processor 163) for enabling the self-defending computing device 101 to perform various functions as discussed herein. For example, the memory 115 may store software and/or files used by the self-defending computing device 101, such as an operating system 117, one or more application programs 119, and/or an associated database 121. The memory 115 may include a file system (e.g., stored in the database 121) associated with the self-defending computing device 101, where the file system includes one or more directories and/or protected (e.g., read-only) directories. The secure memory 165 may store one or more computer readable instructions (e.g., software) to perform cryptographic/algorithmic and/or self-defending operations as described herein. In addition, some or all of the computer executable instructions for the self-defending computing device 101 may be embodied in hardware or firmware. Although not shown, the RAM 105 may include one or more applications representing the application data stored in the RAM 105 while the self-defending computing device 101 is on and corresponding software applications (e.g., software tasks) are running on the self-defending computing device 101.

The communications module 109 may include a microphone, a keypad, a touch screen, and/or a stylus through which a user of the self-defending computing device 101 may provide input, and may include one or more of a speaker for providing audio output and a video display device for providing textual, audiovisual, and/or graphical output. The computing system environment 100 may also include optical scanners (not shown). The communications module 109 may include one or more networking devices (e.g., antennas, network cards, radios, and the like) to enable wireless and/or wired communications at the self-defending computing device 101. Wireless communications may include communications via a cellular network, Wi-Fi, Bluetooth, and/or other wireless communication methods. The communications module 109 may include one or more location detection devices, including, for example, a global positioning system (GPS) device. The communications module 109 may include one or more network interfaces. The one or more network interfaces of the communications module 109 may include a TCP port, a User Datagram Protocol (UDP) port, and/or any other communication port.

The self-defending computing device 101 may operate in a networked environment supporting connections to one or more remote computing devices, such as the computing devices 141 and 151. The computing devices 141 and 151 may be personal computing devices or servers that include any or all of the elements described above relative to the self-defending computing device 101.

The network connections depicted in FIG. 1 may include a Local Area Network (LAN) 125 and/or a Wide Area Network (WAN) 129, as well as other networks (e.g., a cellular network). When used in a LAN networking environment, the self-defending computing device 101 may be connected to the LAN 125 through a network interface or adapter in the communications module 109. When used in a WAN networking environment, the self-defending computing device 101 may include a modem in the communications module 109 or other means for establishing communications over the WAN 129, such as a network 131 (e.g., public network, private network, cellular network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The secure module 160 may include one or more secure characteristics. The hardware of the secure module (e.g., the secure processor 163, the secure memory 165) may operationally isolated from the other hardware of the self-defending computing device 101 (e.g., processor 103, RAM 105, ROM 107, memory 115, etc.), such that the secure module 160 operates independently from other hardware of the self-defending computing device 101. The secure module 160 may operate as a trusted execution environment for the self-defending computing device 101, where the secure module 160 is protected from functions associated with a compromised (e.g., jailbroken, rooted, and the like) computing device. For example, if a computing device (e.g., the self-defending computing device 101) is jailbroken, the secure memory 165 of the secure module 160 may be protected from software modifications (e.g., deletion, overwrite, and/or any other modification) by malicious applications and/or functions associated with the jailbroken computing device. The secure module 160 may execute software and/or firmware that is authorized (e.g., signed) by a manufacturer, a service provider, and/or an enterprise organization associated with the self-defending computing device 101. The software and/or firmware that is authorized (e.g., signed) may be installed at the secure module 160 during a manufacturing process. In some cases, the software and/or firmware that is authorized (e.g., signed) may be updated via an authorized update from a manufacturer, a service provider, and/or an enterprise organization.

The secure module 160 may perform one or more operations. The secure module 160 may perform one or more operations, for example, via the one or more secure processors (e.g., secure processor 163). The secure module 160 may perform one or more cryptographic and/or algorithmic operations. The one or more cryptographic and/or algorithmic operations may include hash generation/storage, biometric data generation/storage, password generation/storage, and/or any other cryptographic/algorithmic operations for the self-defending computing device 101. For example, the secure module 160 may store security information (e.g., passcodes, biometric data, encryption/decryption keys, and the like) associated with the self-defending computing device 101. The secure module 160 may determine a hash (e.g., checksum) for one or more files, applications, and/or directories of the memory 115. The secure module 160 may store the determined hash in the secure memory 165. Example hash techniques may include secure hash algorithm 3 (SHA-3), BLAKE3, RIPE message digest 160 (RIPEMD-160), and the like.

The secure module 160 may perform one or more self-defending operations to monitor, identify, and/or mitigate malicious activity in the event the self-defending computing device 101 is compromised. The secure module 160 may execute a health check to monitor and identify malicious activity (e.g., activity that is indicative of a comprised state) at the self-defending computing device 101. The secure module 160 may execute a health check continuously, periodically (e.g., every minute, every hour, etc.), and/or based on one or more event triggers.

An event trigger may include an expiration of a time interval (e.g., a periodic time interval), for example, if the secure module 160 is configured to execute a health check on periodic time intervals. For example, the expiration of a 5 minute time interval may cause the secure module to execute a health check. An event trigger may include startup (e.g., powering on) of the self-defending computing device 101. For example, based on startup of the self-defending computing device 101, the secure module 160 may execute a health check of the self-defending computing device 101. Additionally, an event trigger may include an activation and/or a deactivation of the elements (e.g., antennas, network cards, radios, and the like) of the communication module 109. For example, configuring the self-defending computing device 101 to disable a cellular antenna and/or a Wi-Fi antenna (e.g., an airplane mode, and the like) may cause the secure module to execute a health check. An event trigger may include an interaction with the secure module 160. An interaction with the secure module 160 may include an element (e.g., application, program, and the like) of the self-defending computing device 101 accessing, requesting, modifying, storing, and/or otherwise using information stored at the secure module 160 (e.g., in the secure memory 165) by the processor 103. For example, a financial application (e.g., application 119) may request the use of biometric security information that is stored in the secure memory 165 of the secure module 160. Based on the request for the use of the biometric security information, the secure module 160 may execute a health check of the self-defending computing device 101. Additionally, or alternatively, for example, the operating system 117 may request to store a passcode associated with a social media application (e.g., application 119) at the secure module 160. Based on the request to store a passcode at the secure module 160, the secure module 160 may execute a health check of the self-defending computing device 101.

As discussed above, the secure processor 163 of the secure module 160 may execute the health check of the self-defending computing device 101 in response to an event trigger. Additionally, or alternatively, the secure processor 163 may continuously execute the health check of the self-defending computing device 101. The health check may include monitoring, scanning, and/or otherwise analyzing aspects of the self-defending computing device 101 (e.g., applications, data stores, file systems, communications modules, and the like) to identify one or more anomalies. For the health check, the secure processor 163 may scan and/or analyze the data stored at the memory 115, including the operating system 117, the one or more applications 119, and/or the database 121 (e.g., including file systems, directories, and the like) to identify one or more anomalies. The secure processor 163 may monitor one or more network interfaces (e.g., communication ports) of the communications module 109 in a health check to identify one or more anomalies. For the health check, the secure processor 163 may scan one or more network interfaces (e.g., communication ports) of the communications module 109 and identify one or more applications and/or programs that use and/or monitor the one or more network interfaces. In some cases, the secure processor 163 may scan one or more files stored in the memory 115 to identify hash information of the one or more files. Hash information associated with the one or more files may be stored in the secure memory 165. The secure processor 163 may compare the identified hash information to the hash information stored in the secure memory 165 (e.g., to identify invalid hash information representative of changes made to the files). In some cases, the one or more files may be stored in protected directories and/or protected data stores of the memory 115. For the health check, the secure processor 163 may scan one or more applications (e.g., application 119) stored in the memory and identify signature information for the one or more applications and/or certificates associated with the one or more applications. The signature information may include developer information associated with an application, third-party (e.g., certificate authority) information, and/or one or more application signatures.

The secure module 160 may include a threat data store, for example, stored in the secure memory 165. The threat data store may include identifying information for one or more threats, malware (e.g., viruses), and/or any other malicious programs that may indicate that the self-defending computing device 101 is compromised. The identifying information may include one or more computer readable instructions (e.g., bytes of code) that are associated with the one or more threats, malware (e.g., viruses), and/or other malicious programs. For example, the threat data store may include a portion of the executable code associated with a malware. For the health check, the secure module 160 may compare one or more files, programs, and/or data stored in the memory 115 with the information stored in the threat database. The secure processor 163 may compare one or more files, programs, applications, and/or data stored in the memory 115 to the identifying information stored in the threat database, for example, to detect threats to the self-defending computing device 101. The threat data store may be updated, for example, based on an update (e.g., to the health check configuration that includes the threat data store) from a manufacturer, service provider, and/or enterprise organization associated with the self-defending computing device 101 as described herein.

The secure module 160 may include a prohibited location data store, for example, stored in the secure memory 165. The prohibited location data store may include information associated with one or more locations where the self-defending computing device 101 may be prohibited from operating (e.g., prohibited locations). An enterprise organization may allow use of the self-defending computing device 101 at a first set of locations and prohibit use of the self-defending computing device 101 at a second set of locations, for example, based on configuring the prohibited location data store. For the health check, the secure module 160 may determine the location of the self-defending computing device 101. The secure module 160 may determine the location of the self-defending computing device 101, for example, by querying and/or accessing location information from the communications module 109, where the communications module 109 includes one or more location detection devices (e.g., a GPS device, cellular antenna for triangulation, and the like) that may determine the location of the self-defending computing device 101. The secure module 160 may compare the determined location of the self-defending computing device 101 with the location information of the prohibited location data store. The secure module 160 may compare the determined location of the self-defending computing device 101 with the location information of the prohibited location data store, for example, based on determining the location of the self-defending computing device 101. The secure module 160 may identify the determined location of the self-defending computing device 101 as an anomaly, for example, based a determination that the location of the self-defending computing device is associated with a prohibited location included in the location information of the prohibited location data store.

The secure processor 163 may execute the health check based on a health check configuration. The health check configuration as described herein may include the threat data store and/or the prohibited location data store. The health check configuration may define health check parameters including parameters associated with the elements of the self-defending computing device 101 that are monitored, scanned, and/or otherwise analyzed to identify one or more anomalies. For example, the health check configuration may configure the secure module 160 to scan one or more network interfaces (e.g., communication ports) of the communications module 109 and compare one or more files to threat information stored in the secure module 160. The health check configuration may define the one or more anomalies of the self-defending computing device 101 that are indicative of security flaws and/or departures from secure (e.g., baseline) operating conditions. The health check configuration may be stored in the secure memory 165. The health check configuration may be configured and/or updated by a manufacturer, a service provider, and/or an enterprise organization associated with the self-defending computing device 101. For example, a manufacturer may configure the health check configuration during manufacturing of the self-defending computing device 101. Additionally, or alternatively, for example, an enterprise organization associated with a user of the self-defending computing device 101 may update the health check configuration to modify the elements of the self-defending computing device 101 that are analyzed during the health check. The health check configuration may be updated via an update provided by the network 131.

The secure processor 163 may identify one or more anomalies during execution of the health check. The one or more anomalies may include an operation, feature, and/or process at the self-defending computing device 101 that indicates the self-defending computing device 101 is compromised via a jailbreak, root operation, and/or any other security flaw. Additionally, or alternatively, the one or more anomalies may be any departure from baseline (e.g., secure) operations for the self-defending computing device 101. The one or more anomalies may be defined by the health check configuration. In the health check configuration, each anomaly of the one or more anomalies may be assigned with a weight (e.g., a numerical weighting value) that may correspond to a severity of the anomaly. For example, a first anomaly (e.g., an application that include information indicative of malware) may be assigned a numerical weighting value of 5 to indicate a high degree of severity associated with the first anomaly (e.g., an application that includes identifying information indicative of malware) and a second anomaly (e.g., an application that includes an unsigned signature) may be assigned a numerical weighting value of 1 to indicate a low degree of severity associated with the second anomaly. The severity of an anomaly may indicate a degree to which the self-defending computing device 101 is compromised via a security flaw. The one or more anomalies may include an application (e.g., a malicious application) monitoring and/or using a network interface (e.g., communication port) of the communications module 109, where the application is not associated with the network interface. For example, a malicious application that is not associated with secure login procedures (e.g., secure shell (SSH)) may use and/or monitor a communication port (e.g., TCP port 22) associated with secure login procedures for data sent and/or received by the self-defending computing device 101. The one or more anomalies may include an application that uses a non-standard communication protocol at a network interface (e.g., communication port) of the communications module 109. A non-standard communication protocol may be a communication protocol that is not commonly associated with the network interface. For example, an application may use FTP as a non-standard protocol on TCP port 80, where HTTP is commonly associated with TCP port 80.

In some cases, the one or more anomalies may include an invalid hash of a file that is located in a directory (e.g., a protected directory) of a file system (e.g., database 121) stored in a memory (e.g., memory 115) of the self-defending computing device 101. The secure module 160 may determine a hash of a file is invalid (e.g., an invalid hash) if the hash does not correspond to hash information stored in the secure memory 165. The one or more anomalies may include a file and/or application inappropriately stored in a memory (e.g., memory 115) that is from an untrusted, unknown, and/or malicious source. The secure module 160 may determine that a file and/or application is from an untrusted, unknown, and/or malicious source, for example, if the application uses an unsigned, self-signed, and/or invalid key (e.g., signature) for the application and/or for a certificate associated with the application.

In some cases, the one or more anomalies may include operation of the self-defending computing device 101 in a prohibited geographic location and/or area as configured by the prohibited location data store. The secure module 160 may determine that the determined location of the self-defending computing device 101 is a location where the self-defending computing device 101 is prohibited from operating (e.g., a prohibited location), for example, based on a comparison of the determined location with the prohibited location information of the prohibited location data store during a health check. For example, the prohibited location data store may include a country (e.g., a prohibited country) as a prohibited location in the prohibited location information. During the health check, the secure module 160 may determine that the self-defending computing device 101 is operating in the prohibited country, for example, based on a comparison of the determined location of the self-defending computing device 101 (e.g., within the prohibited country) to the prohibited location information (e.g., including the prohibited country). Additionally, or alternatively, for example, the prohibited location data store may include a city, county, state, address (e.g., a building), campus, and/or another other specific location as a prohibited location. The one or more anomalies may be a file, program, and/or application stored in the memory 115 that includes identifying (e.g., threat) information, where the identifying information is indicative of one or more threats, malware (e.g., viruses), and/or other malicious programs as described herein. The identifying information may correspond to information stored in the threat data store as described herein.

The secure module 160 may execute one or more response measures based on the organization's requirement configuration, such as those defined by meeting a measured of risk threshold. The secure module 160 may execute one or more response measures, for example, based on detecting one or more anomalies during the health check of the self-defending computing device 101. The secure module 160 may execute one or more response measures, for example, based on a response configuration stored at the secure module 160 (e.g., in the secure memory 165). The one or more response measures (e.g., executed by the secure module 160) may prevent compromised operation of the self-defending computing device 101 and/or may secure data accessible at the self-defending computing device 101. The one or more response measures may be executed individually and/or in combination, for example, based on the response configuration. The response configuration of the secure module 160 may be stored in the secure memory 165. The response configuration of the secure module 160 (and corresponding response measures) may be configured by the manufacturer, service provider, and/or the enterprise organization associated with the self-defending computing device 101. For example, a manufacturer may configure the response configuration during manufacturing of the self-defending computing device 101. Additionally, or alternatively, for example, an enterprise organization may configure the secure module 160 with a first response configuration and a manufacturer may configure the secure module 160 with a second response configuration, where the response measures included in the first response configuration are different from the response measures included in the second response configuration.

The response configuration may include one or more parameters that determine the one or more response measures for execution by the secure module 160, for example, based on the severity and/or number of anomalies detected by the health check. For example, the response configuration may configure one or more response measures for execution based on the numerical weighting value associated with each anomaly detected during the health check and/or based on the number of anomalies detected during the health check. In some cases, the response configuration may configure one or more response measures for execution based on an satisfaction of a severity threshold (e.g., a numerical severity threshold). The satisfaction of the severity threshold may be based on a comparison of the severity threshold to a maximum numerical weighting value of a detected anomaly, a minimum numerical weighting value of a detected anomaly, and/or a combination (e.g., a sum) of the numerical weighting value(s) of the detected anomaly(ies). For example, a first set of response measures may be configured in the response configuration if the health check determines an anomaly with a numerical weighting value equal to or above a severity threshold. Additionally, or alternatively, for example, a second set of response measures may be configured in the response configuration if the health check determines that the sum of the numerical weighting values of the detected anomalies is less than a severity threshold.

In some cases, the one or more response measures may include overwriting the sensitive data (e.g., passcodes, biometric data, encryption/decryption keys, and the like) stored in the secure memory 165. The sensitive data may include biometric data associated with user(s) of the self-defending computing device 101, passcode data associated with locking/unlocking the self-defending computing device 101 and applications (e.g., applications 119) of the self-defending computing device 101, and/or data associated with encryption of one or more areas of the memory 115 (e.g., operating system 117, applications 119, database 121) and/or secure memory 165. The one or more response measures may include deleting/removing biometric data (e.g., stored in the secure memory 165) from the self-defending computing device 101. The one or more response measures may include overwriting a security key (e.g., a passcode) of the self-defending computing device 101 with a second security key. The second security key may include one or more characters that are inaccessible at an input device of the communication module 109 of the self-defending computing device 101. For example, the secure processor 163 may replace a passcode comprised of American Standard Code for Information Interchange (ASCII) characters of the self-defending computing device 101 with a second passcode, where the second passcode includes one or more characters (e.g., hexadecimal characters) different from the ASCII characters of the passcode that are unavailable (e.g., inaccessible) at an input (e.g., touch screen) of the communications module 109. The one or more response measures may include encrypting one or more data stored at the memory 115 (e.g., operating system 117, applications 119, and/or database 121) and/or at the secure memory 165. The one or more response measures may include encrypting one or more data items stored at the memory 115 and/or at the secure memory 165, for example, using a public encryption key. A private decryption key that corresponds to the public encryption key may not be accessible at the self-defending computing device 101. The private decryption key may be available via a manufacturer, a service provider, and/or an enterprise organization associated with the self-defending computing device 101. For example, based on encryption of the contents of the memory 115 by the secure module 160 using a public key from an enterprise organization, a user may be required to request decryption from the enterprise organization using the corresponding private key to decrypt the contents of the memory 115.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 2A:
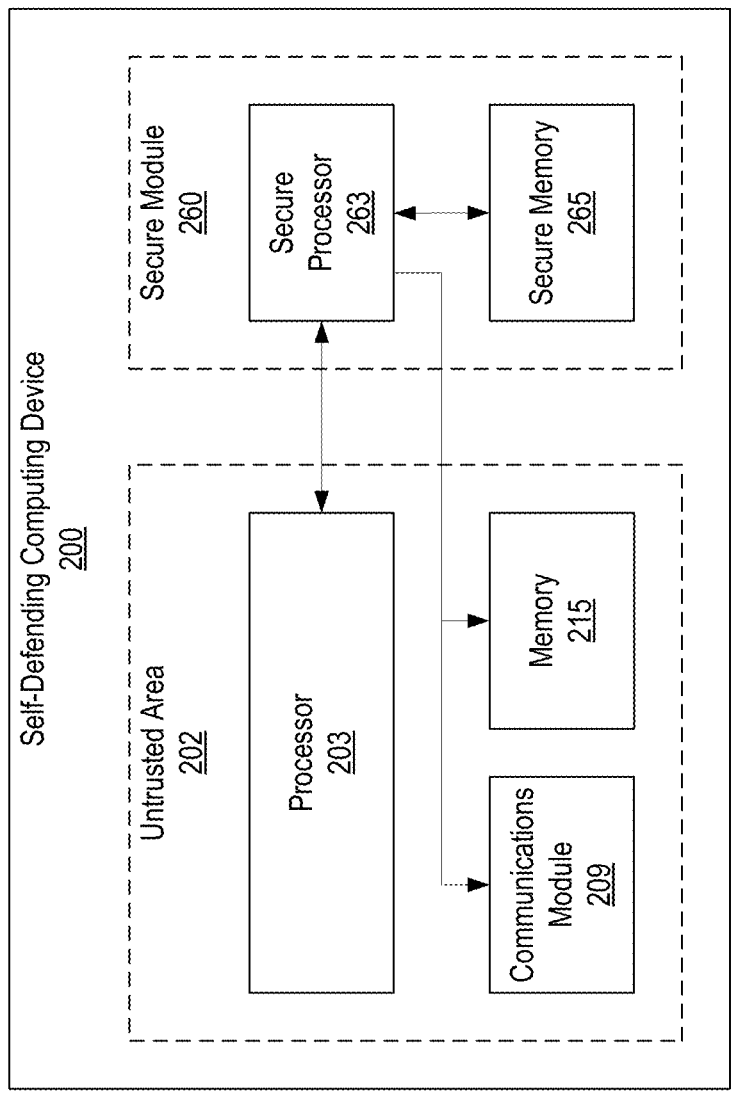
FIG. 2A shows an illustrative example configuration of a self-defending computing device in accordance with one or more aspects described herein.

FIG. 2A shows an illustrative example configuration of a self-defending computing device 200 in accordance with one or more aspects described herein. The self-defending computing device 200 may include one or more hardware and/or characteristics of the self-defending computing device 101 as described herein with respect to FIG. 1. The self-defending computing device 200 may include an untrusted area 202 with one or more hardware. The self-defending computing device 200 may include a processor 203. The processor 203 may include one or more characteristics of the processor 103 as described herein with respect to FIG. 1. The self-defending computing device 200 may include a communications module 209. The communications module 209 may include one or more characteristics of the communications module 109 as described herein with respect to FIG. 1. The self-defending computing device 200 may include a memory 215. The memory 215 may include one or more characteristics of the memory 115 as described herein with respect to FIG. 1. The self-defending computing device 200 may include one or more other hardware (e.g., RAM 105, ROM 107) of the self-defending computing device 101, for example, as a part of the untrusted area 202.

The self-defending computing device 200 may include a secure module 260. The secure module 260 may include one or more hardware and/or characteristics of the secure module 160 as described herein with respect to FIG. 1. The secure module 260 may include a secure processor 263 and a secure memory 265. The secure processor 263 may include one or more characteristics of the secure processor 163 as described herein with respect to FIG. 1. The secure memory 265 may include one or more characteristics of the secure memory 165 as described herein with respect to FIG. 1. The secure module 260 may perform cryptographic/algorithmic and/or self-defending operations as described herein. For example, the secure processor 263 may perform both cryptographic/algorithmic and self-defending operations. The secure processor 263 may access and/or interface with one or more elements of the untrusted area 202 of the self-defending computing device 200. For example, the secure processor 263 may access and/or interface with the processor 203, the communications module 209, and/or the memory 215 to perform cryptographic/algorithmic and self-defending operations.

Figure 2B:
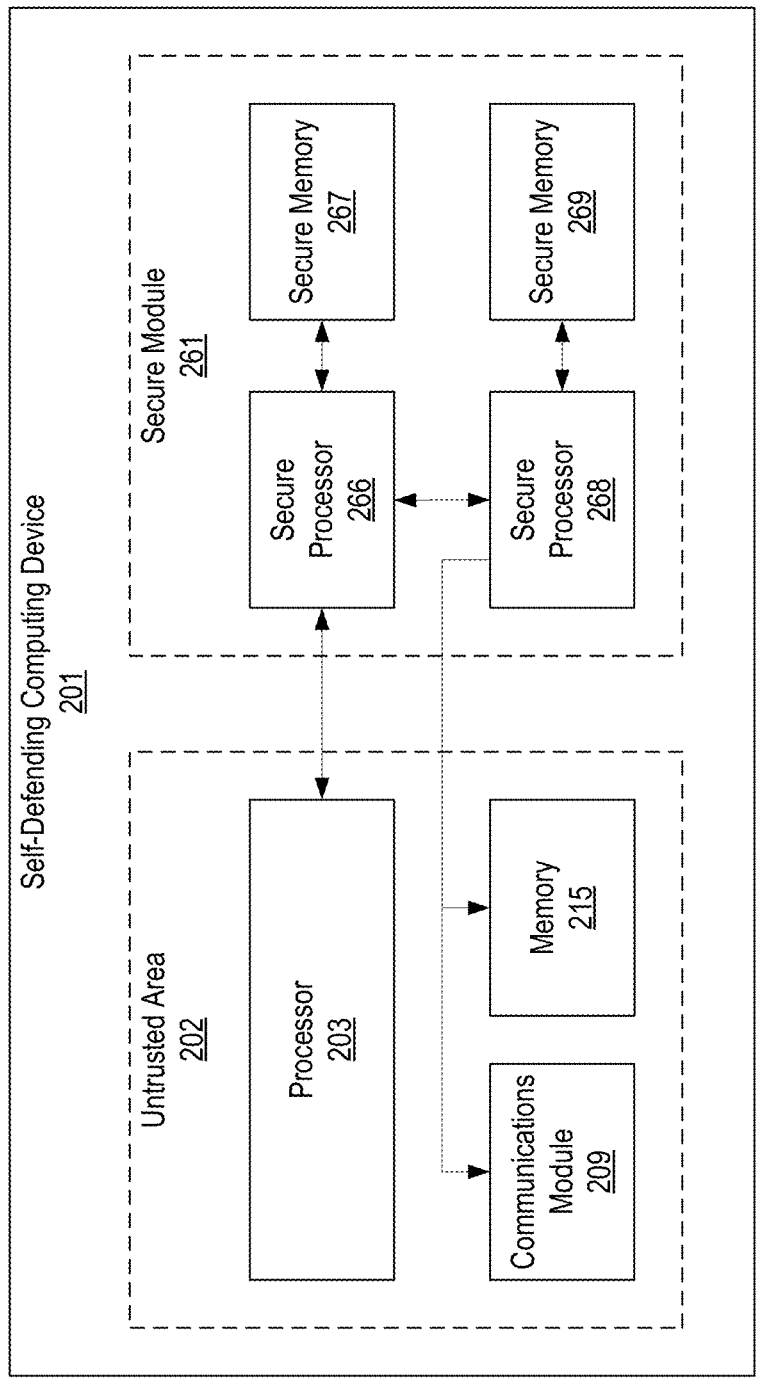
FIG. 2B shows an illustrative example configuration of a self-defending computing device in accordance with one or more aspects described herein.

FIG. 2B shows an illustrative example configuration of a self-defending computing device 201 in accordance with one or more aspects described herein. The self-defending computing device 201 may include one or more hardware and/or characteristics of the self-defending computing device 101 as described herein with respect to FIG. 1. The self-defending computing device 201 may include an untrusted area 202 with one or more hardware. The self-defending computing device 201 may include a processor 203. The processor 203 may include one or more characteristics of the processor 103 as described herein with respect to FIG. 1. The self-defending computing device 200 may include a communications module 209. The communications module 209 may include one or more characteristics of the communications module 109 as described herein with respect to FIG. 1. The self-defending computing device 200 may include a memory 215. The memory 215 may include one or more characteristics of the memory 115 as described herein with respect to FIG. 1. The self-defending computing device 200 may include one or more other hardware (e.g., RAM 105, ROM 107) of the self-defending computing device 101, for example, as a part of the untrusted area 202.

The self-defending computing device 201 may include a secure module 261. The secure module 261 may include one or more hardware and/or characteristics of the secure module 160 as described herein with respect to FIG. 1. In some cases, the secure module 261 may include one or more secure processors (e.g., secure processor 266, secure processor 268). For example, the secure module 261 may include a secure processor 266 and a secure processor 268. In some cases, the secure module 261 may include one or more secure memories. For example, the secure module 261 may include a secure memory 267 and a secure memory 269. The secure processor 266 and/or the secure processor 268 may include one or more characteristics of the secure processor 163 as described herein with respect to FIG. 1. The secure memory 267 and/or the secure memory 269 may include one or more characteristics of the secure memory 165 as described herein with respect to FIG. 1. The secure module 261 may perform cryptographic/algorithmic and/or self-defending operations as described herein. For example, the secure processor 266 may perform cryptographic/algorithmic operations and the secure processor 268 may perform self-defending operations. The secure processor 266 and/or the secure processor 268 may access and/or interface with one or more elements of the untrusted area 202 of the self-defending computing device 200. For example, the secure processor 266 may access and/or interface with the processor 203 to perform cryptographic/algorithmic operations and the secure processor 268 may access and/or interface with the processor 203, the communications module 209, and/or the memory 215 to perform self-defending operations.

Figure 3:
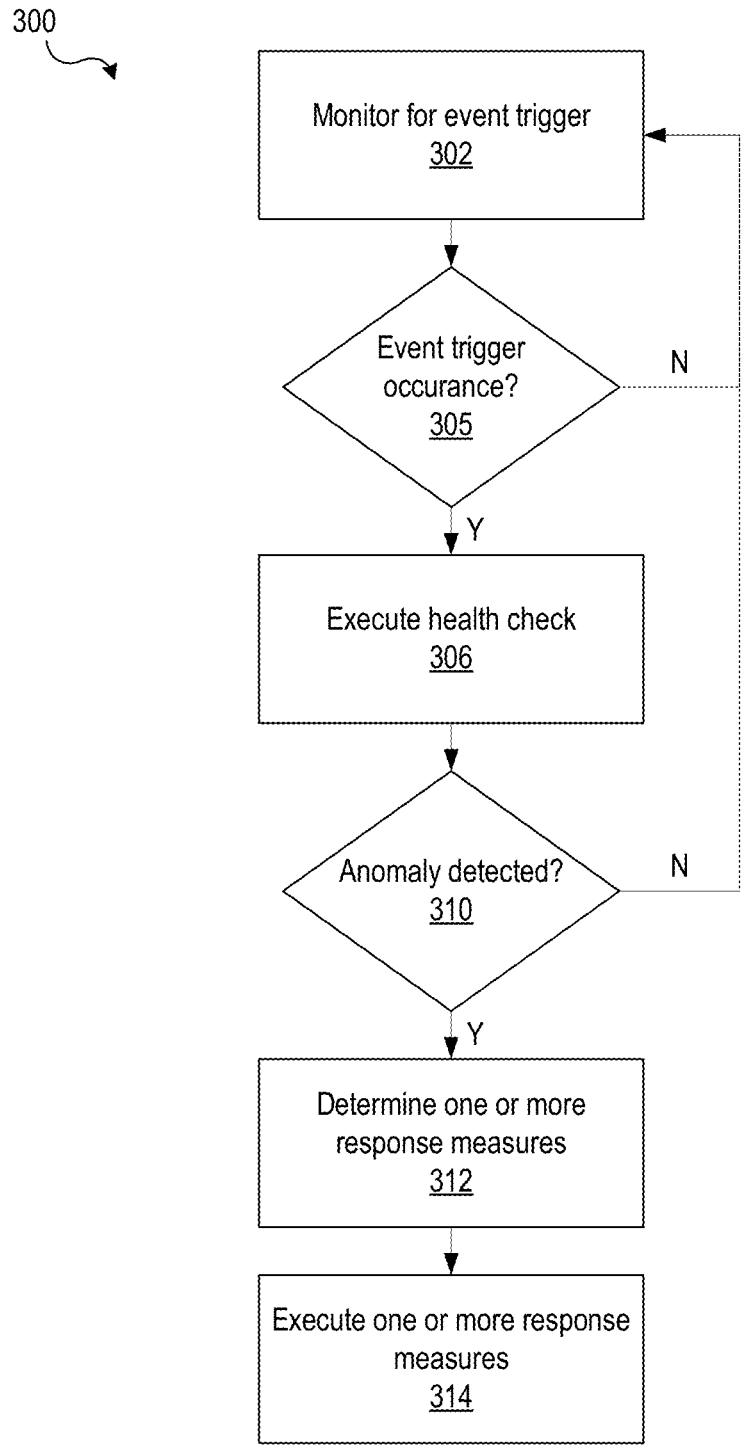
FIG. 3 shows an illustrative event sequence for executing one or more response measures by a self-defending computing device in accordance with one or more aspects described herein.

FIG. 3 shows an illustrative event sequence 300 for executing one or more response measures by a self-defending computing device (e.g., self-defending computing device 101, self-defending computing device 200, self-defending computing device 201) in accordance with one or more aspects described herein. The secure processor 163 of the self-defending computing device 101 may execute the illustrative event sequence 300 to monitor for an event trigger, execute a device health check, identify operating anomalies, and execute response measures to secure data of the self-defending computing device 101. The secure processor 163 may monitor for an event trigger at the self-defending computing device 101 at 302. The event trigger may be one or more of the event triggers as described herein with respect to FIG. 1. The secure processor 163 may determine if an event trigger has occurred at 305, for example, based on monitoring for an event trigger at the self-defending computing device 101. The secure processor 163 may continue monitoring for an event trigger at 302, for example, based on determining that an event trigger has not occurred at 305. The secure processor 163 may execute a health check of the self-defending computing device 101 at 306, for example, based on determining that an event trigger has occurred at 305. As described herein for the health check with respect to FIG. 1, the secure processor 163 may analyze the data stored at the memory 115, may scan one or more network interfaces (e.g., communication ports) of the communications module 109, may compare files stored in the memory 115 to known threat information, and/or may determine the location of the self-defending computing device 101 to identify one or more anomalies. The secure processor 163 may determine if one or more anomalies are identified by the health check at 310. The secure processor 163 may continue monitoring for an event trigger at 302, for example, based on determining that one or more anomalies were not identified by the health check at 310.

The secure processor 163 may determine one or more response measures at 312. The secure processor 163 may determine one or more response measures, for example, based on determining one or more anomalies were detected during the health check. The secure processor 163 may determine one or more response measures, for example, based on a response configuration. As described herein, the response configuration may configure one or more response measures for execution based on the severity and/or the number of anomalies detected by the health check. The response configuration may be stored in the secure memory 165 and may be configured by the manufacturer, the service provider, and/or the enterprise organization associated with the self-defending computing device 101 as described herein. The secure processor 163 may execute and/or cause execution of one or more response measures at 314. The secure processor 163 may execute one or more response measures, for example, based on determining the one or more response measures from the response configuration as described herein such as to prevent the computing device from continuing to be used whilst potentially being in an insecure or compromised state. The one or more response measures may include overwriting the sensitive data (e.g. passcodes, biometric data, cryptographic keys, and the like) stored in the secure memory 165, deleting/removing biometric data (e.g., stored in the secure memory 165), overwriting a security key (e.g., a passcode) of the self-defending computing device 101 with a second security key, encrypting data stored at the memory 115 and/or at the secure memory 165, and/or any other response measure to secure data accessible at the self-defending computing device 101. The illustrative event sequence 300 may terminate, for example, based on execution of the one or more response measures. The illustrative event sequence 300 may be modified, for example, to conserve resources (e.g., power consumption, processing capability, memory availability, and the like) of the self-defending computing device 101 (e.g., for a self-defending computing device 101 configured to continuously execute a health check at 306). For example, if the self-defending computing device 101 is configured to execute the health check continuously at 306 as a part of the illustrative event sequence 300, the execution of the health check may be modified to execute based on an event trigger as described herein to conserve power. Events of the illustrative event sequence 300 may be removed, supplemented, and/or otherwise modified without departing from the scope of the present disclosure. The secure processor 263 of the self-defending computing device 200 and/or the secure processor 268 of the self-defending computing device 201 respectively may execute the illustrative event sequence 300 as described herein.

Figure 4:
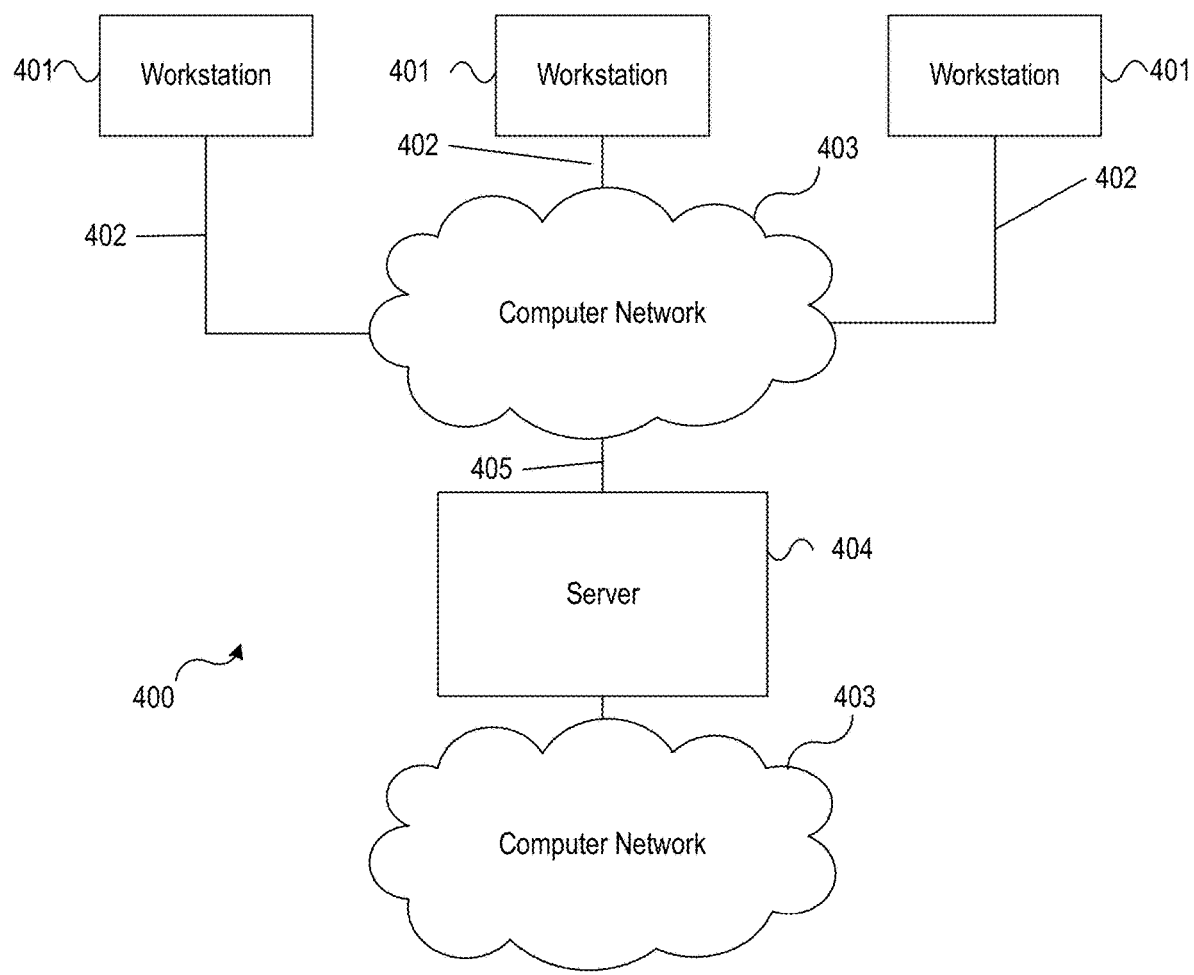
FIG. 4 shows an illustrative block diagram of workstations and servers that may be used to implement the processes and functions of certain aspects of the present disclosure in accordance with one or more aspects described herein.

FIG. 4 shows an illustrative block diagram of workstations and servers that may be used to implement the processes and functions of certain aspects of the present disclosure in accordance with one or more example embodiments. For example, an illustrative system 400 may be used for implementing illustrative embodiments according to the present disclosure. As illustrated, the system 400 may include one or more workstation computers 401. The workstation 401 may be, for example, a desktop computer, a smartphone, a wireless device, a tablet computer, a laptop computer, and the like, configured to perform various processes described herein. The workstation 401 may include a self-defending computing device (e.g., the self-defending computing device 101, the self-defending computing device 200, and/or the self-defending computing device 201). The workstations 401 may be local or remote, and may be connected by one of the communications links 402 to a computer network 403 that is linked via the communications link 405 to the server 404. In the system 400, the server 404 may be a server, processor, computer, or data processing device, or combination of the same, configured to perform the functions and/or processes described herein. In some cases, the self-defending computing device may operate one or more applications that may exchange secure or private data with the server 404. For example, the application 119 (e.g., a financial services application and the like), may operate on the self-defending computing device 101 and may exchange secure information with the server 404, such as personal identifying information, financial account information, and the like. In an illustrative example, the server 404 may be used to receive check images and associated data and/or validation scores, retrieve user profile, evaluate the check image compared to the user profile, identify matching or non-matching elements, generate user interfaces, and the like. The server 404 may be used to send one or more updates to the secure module 160, for example, via a manufacturer, a service provider, and/or an enterprise organization. For example, the server 404 may send one or more updates to the health check configuration and/or the response configuration stored in a secure memory (e.g., secure memory 165).

The computer network 403 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 402 and 405 may be communications links suitable for communicating between the workstations 401 and the server 404, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A system comprising:
    an update server communicatively coupled to a network, wherein the server communicates a health check configuration to a plurality of computing devices;
    a computing device, comprising:
        a primary processor;
        a communication interface communicatively coupled to the primary processor;
        a primary non-transitory memory device comprising secure memory and storing computer-readable instructions that, when executed by the primary processor, cause the computing device to:
            facilitate communication by one or more applications via one or more network interfaces of a communication interface; and
        a secure module comprising:
            a secure processor, different from the primary processor; and
            a secure and read-only non-transitory memory device pre-configured with second computer-readable instructions protected from software modifications, wherein the second computer-readable instructions, when executed by the secure processor, cause the computing device to:
                receive, from the update server, a health check configuration;
                monitor the computing device for an event trigger;
                initiate, based on the event trigger and the health check configuration, of a health check of the computing device to identify one or more anomalies, wherein the one or more anomalies are associated with a security flaw at the computing device;
                determine, based on an identified anomaly and a response configuration stored in the secure memory, one or more response measures, wherein the anomaly is identified in the health check; and
                initiate the one or more response measures at the computing device, the one or more response measures including a replacement passcode with one or more characters that are inaccessible at an input of the computing device.

2. The system of claim 1, wherein the event trigger comprises at least one of:
    an expiration of a time interval;
    a request to access data stored in the secure memory;
    a request to store data in the secure memory;
    deactivation of the communication interface; and
    a startup of the computing device.

3. The system of claim 1, wherein the execution of the health check further causes the computing device to perform at least one of:
    a scan of the one or more network interfaces of the communication interface to identify one or more applications associated with the one or more network interfaces, wherein the one or more applications associated with the one or more network interfaces monitor or use the one or more network interfaces;
    a scan of one or more files to identify hash information associated with the one or more files, wherein one or more protected directories of the primary memory comprise the one or more files;
    a scan of one or more applications stored in the primary memory to identify signature information associated with the one or more applications; and
    a comparison of one or more files to threat information stored in a threat data store of the secure memory, wherein one or more directories of the primary memory comprise the one or more files and wherein the threat information comprises information associated with one or more malware.

4. The system of claim 1, wherein the execution of the health check further causes the computing device to:
receive, when available via the network, an updated health check configuration from the update server.

5. The system of claim 1, wherein the execution of the health check further causes the computing device to:
determine, by a location detection device of the computing device, location information that indicates a geographic location of the computing device; and
compare, by the secure module, the location information to a plurality of prohibited locations, wherein the health check configuration comprises the plurality of prohibited locations.

6. The system of claim 1, wherein the one or more anomalies comprise at least one of:
an invalid hash of a file, wherein the file is stored in a protected directory of the primary memory and wherein the invalid hash is different from one or more hashes stored in the secure memory;
signature information of an application stored in the primary memory, wherein the signature information comprises one of an invalid signature, a self-signed signature, or an unsigned signature;
location information indicating a location of a plurality of prohibited locations, wherein the health check configuration comprises the plurality of prohibited locations;
a file comprising threat information, wherein the threat information is stored in a threat data store of the secure memory and wherein the threat information comprises information associated with one or more malware;
an application that uses a communication protocol at a network interface of the communication interface, wherein the communication protocol is different from a second communication protocol that is associated with the network interface; or
an application that monitors one or more communications at a network interface of the communication interface, wherein the application is not associated with the network interface.

7. The system of claim 1, wherein the response measures comprise two or more of:
an overwrite of sensitive data stored at the secure memory, wherein the sensitive data comprises biometric data associated with a user of the computing device, passcode data associated with unlocking the computing device, and data associated with encryption of one or more areas of the primary memory;
a deletion of the biometric data;
replacement of original passcode data with second passcode data, wherein the second passcode data includes one or more characters that are inaccessible at an input of the computing device; or
an encryption of the sensitive data using a public key, wherein a private key associated with the public key is unavailable at the computing device.

8. The system of claim 1, wherein the second instructions further cause the computing device to:
receive, via a network coupled to the communication interface and from a service provider, an authorized update to the health check configuration;
receive, via the network and from a service provider, an authorized update to the response configuration; and
receive, via the network and from a service provider, an authorized update to a threat data store of the secure memory.

9. A method, comprising:
at a computing device comprising one or more primary processors, primary non-transitory memory, one or more secure processors, secure non-transitory memory, and a communication interface:
monitoring, by a secure processor of the one or more secure processors, operation of the one or more primary processors of the computing device for an event trigger;
executing, by the secure processor based on an identified event trigger and based on a health check configuration stored in secure non-transitory memory, a health check of the computing device to identify an indication of one or more anomalies, wherein the one or more anomalies are associated with a security flaw at the computing device;
determining, based on an identified anomaly and a response configuration stored in the secure non-transitory memory, one or more response measures; and
initiating, based on a determined response measure, the one or more response measures at the computing device, wherein the one or more response measures uses replacement passcode data including one or more characters that are inaccessible at an input of the computing device.

10. The method of claim 9, wherein the event trigger comprises at least one of:
an expiration of a time interval;
a request to access data stored in the secure non-transitory memory;
a request to store data in the secure non-transitory memory;
deactivation of the communication interface; and
a startup of the computing device.

11. The method of claim 9, wherein the executing the health check further comprises at least one of:
scanning one or more network interfaces of the communication interface to identify one or more applications associated with the one or more network interfaces, wherein the one or more applications associated with the one or more network interfaces monitor or use the one or more network interfaces;
scanning one or more files to identify hash information associated with the one or more files, wherein one or more protected directories of the primary memory comprise the one or more files;
scanning one or more applications stored in the primary memory to identify signature information associated with the one or more applications;
comparing one or more files to threat information stored in a threat data store of the secure non-transitory memory, wherein one or more directories of the primary memory comprise the one or more files and wherein the threat information comprises information associated with one or more malware;
determining, by a location detection device of the computing device, location information that indicates a geographic location of the computing device; and
comparing, by the secure processor, the location information to a plurality of prohibited locations, wherein the health check configuration comprises the plurality of prohibited locations.

12. The method of claim 9, wherein the one or more anomalies comprise at least one of:
   an invalid hash of a file, wherein the file is stored in a protected directory of the primary memory and wherein the invalid hash is different from one or more hashes stored in the secure non-transitory memory;
   signature information of an application stored in the primary memory, wherein the signature information comprises one of an invalid signature, a self-signed signature, or an unsigned signature;
   location information indicating a location of a plurality of prohibited locations, wherein the health check configuration comprises the plurality of prohibited locations;
   a file comprising threat information, wherein the threat information is stored in a threat data store of the secure non-transitory memory and wherein the threat information comprises information associated with one or more malware;
   an application that uses a communication protocol at a network interface of the communication interface, wherein the communication protocol is different from a second communication protocol that is associated with the network interface; and
   an application that monitors one or more communications at a network interface of the communication interface, wherein the application is not associated with the network interface.

13. The method of claim 9, wherein the one or more response measures comprise at least one of:
   an overwrite of sensitive data stored at the secure non-transitory memory, wherein the sensitive data comprises biometric data associated with a user of the computing device, passcode data associated with unlocking the computing device, and data associated with encryption of one or more areas of the primary memory;
   a deletion of the biometric data;
   replacement of original passcode data with second passcode data, wherein the second passcode data includes one or more characters that are inaccessible at an input of the computing device; and
   an encryption of the sensitive data using a public key, wherein a private key associated with the public key is unavailable at the computing device.

14. The method of claim 9, comprising:
   receiving, via a network coupled to the communication interface and from a service provider, an authorized update to the health check configuration;
   receiving, via the network and from a service provider, an authorized update to the response configuration; and
   receiving, via the network and from a service provider, an authorized update to a threat data store of the secure non-transitory memory.

15. The method of claim 9, comprising updating, when available from an update server, the health check configuration.

16. A computing device comprising:
   a primary processor processing first instructions stored in a first memory, wherein the first instructions, when executed by the primary processor, cause the computing device to facilitate operation of one or more applications and communication by the one or more applications via a network interface;
   a secure processor processing second instructions stored in a secure memory, wherein the second instructions, when processed by the secure processor, cause the computing device to:
   initiate, based on an expiration of a time interval and based on a health check configuration stored in the secure memory, a health check of the computing device to identify one or more anomalies, wherein the one or more anomalies are associated with a security flaw at the computing device;
   determine, based on an identified anomaly and a response configuration stored in the secure memory, one or more response measures, wherein the anomaly is identified in the health check; and
   execute, based on a determined response measure, the one or more response measures at the computing device, wherein a first response measure of the one or more response measures includes a replacement passcode with one or more characters that are inaccessible at an input of the computing device.

17. The computing device of claim 16, wherein the health check further causes the computing device to:
   scan one or more network interfaces of a communication interface to identify one or more applications associated with the one or more network interfaces, wherein the one or more applications associated with the one or more network interfaces monitor or use the one or more network interfaces, wherein the one or more anomalies comprise at least one of:
      an application that uses a communication protocol at a network interface of the communication interface, wherein the communication protocol is different from a second communication protocol that is associated with the network interface; or
      an application that monitors one or more communications at a network interface of the communication interface, wherein the application is not associated with the network interface.

18. The computing device of claim 16, wherein the health check further causes the computing device to:
   scan one or more files to identify hash information associated with the one or more files, wherein one or more protected directories of the primary memory comprise the one or more files,
   wherein the one or more anomalies comprise an invalid hash of a file, wherein the file is stored in a protected directory of the primary memory and wherein the invalid hash is different from one or more hashes stored in the secure memory.

19. The computing device of claim 16, wherein the execution of the health check further causes the computing device to:
   determine, by a location detection device of the computing device, location information that indicates a geographic location of the computing device; and
   compare, by the secure processor, the location information to a plurality of prohibited locations, wherein the health check configuration comprises the plurality of prohibited locations, wherein the one or more anomalies comprise the location information, and wherein the location information indicates a location of the plurality of prohibited locations.

20. The computing device of claim 16, wherein the one or more response measures comprise at least one of:
   an overwrite of sensitive data stored at the secure memory, wherein the sensitive data comprises biometric data associated with a user of the computing device, passcode data associated with unlocking the computing device, and data associated with encryption of one or more areas of the primary memory;
   a deletion of the biometric data;

replacement of original passcode data with second passcode data, wherein the second passcode data includes one or more characters that are unavailable at an input of the computing device; or an encryption of the sensitive data using a public key, wherein a private key associated with the public key is unavailable at the computing device.

\* \* \* \* \*

UNITED STATES PATENT AND TRADEMARK OFFICE
CERTIFICATE OF CORRECTION

| | | |
|---|---|---|
| PATENT NO. | : 12,130,913 B2 | Page 1 of 1 |
| APPLICATION NO. | : 18/224036 | |
| DATED | : October 29, 2024 | |
| INVENTOR(S) | : Myles Lawrence et al. | |

It is certified that error appears in the above-identified patent and that said Letters Patent is hereby corrected as shown below:

On the Title Page

Title, and in the Specification, Column 1, Line 1:
Delete "Self-Defending Mobile Device" and insert --SELF-DEFENDING COMPUTING DEVICE--

Signed and Sealed this
Twenty-seventh Day of May, 2025

Coke Morgan Stewart
*Acting Director of the United States Patent and Trademark Office*